US 6,563,900 B2

(12) United States Patent
Gou et al.

(10) Patent No.: US 6,563,900 B2
(45) Date of Patent: May 13, 2003

(54) RING PLATE AROUND OPENINGS IN REINFORCED CONCRETE CONTAINMENT VESSEL

(75) Inventors: Perng-Fei Gou, Saratoga, CA (US); Harold Edward Townsend, Campbell, CA (US); Carl Rainey, San Jose, CA (US); Gary Wayne Ehlert, San Jose, CA (US); Enrique Rafael Solorzano, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/732,313

(22) Filed: Dec. 7, 2000

(65) Prior Publication Data

US 2002/0071514 A1 Jun. 13, 2002

(51) Int. Cl.⁷ .................................................. G21C 9/00
(52) U.S. Cl. ....................................... 376/293; 376/287
(58) Field of Search ................................ 376/293, 295; 52/171.1, 649.1

(56) References Cited

U.S. PATENT DOCUMENTS

| 3,959,940 | A | | 6/1976 | Ramberg | |
|---|---|---|---|---|---|
| 4,047,691 | A | | 9/1977 | Wolf | |
| 5,119,598 | A | * | 6/1992 | Tajiri et al. | 52/741 |
| 5,295,168 | A | | 3/1994 | Gluntz et al. | |
| 5,301,215 | A | | 4/1994 | Gou et al. | |
| 5,577,085 | A | | 11/1996 | Gou et al. | |
| 5,610,962 | A | | 3/1997 | Solorzano et al. | |
| 5,754,612 | A | | 5/1998 | Gou et al. | |

FOREIGN PATENT DOCUMENTS

| DE | 2 420 628 | 12/1974 | 376/293 |
|---|---|---|---|
| JP | 620258039 | * 11/1987 | |
| JP | 04262296 | 9/1992 | 376/293 |

OTHER PUBLICATIONS

European Search Report, 3 pp. Apr. 26, 2002.

* cited by examiner

Primary Examiner—Michael J. Carone
Assistant Examiner—R. Palabrica
(74) Attorney, Agent, or Firm—Armstrong Teasdale LLP

(57) ABSTRACT

A reinforced concrete containment vessel in a nuclear reactor includes a cylindrical shell having a side wall. The side wall includes an opening and a plurality of reinforcing bars, at least one of which is interrupted at the side wall opening. A reinforcing plate having an opening is located in the cylindrical shell so that the reinforcing plate opening is aligned with the side wall opening and the interrupted reinforcing bars are connected to the reinforcing plate. Reinforcing bar terminators connect the reinforcing bars to the reinforcing plate.

21 Claims, 8 Drawing Sheets

RING PLATE AROUND OPENINGS IN REINFORCED CONCRETE CONTAINMENT VESSEL

BACKGROUND OF THE INVENTION

This invention relates generally to nuclear reactors, and more particularly, to reinforcement ring plates for openings in a reinforced concrete containment vessel that encloses a nuclear reactor.

The containment vessel is a necessary component in a nuclear power plant. It prevents the release of radioactive material to the environment in the event of a component failure inside the containment vessel. Typically, containment vessels are constructed with reinforced concrete and take the form of a cylindrical shell supported on a reinforced concrete foundation and closed at the top by a reinforced concrete slab. Penetrations through the reinforced concrete containment vessel (RCCV) shell are installed to allow for the passage of steam lines, feedwater lines, emergency cooling lines, instrumentation and control lines, and/or electrical power lines. In addition, openings in the cylindrical shell are often times needed for equipment hatches and personnel access.

There are many various types of loads on an RCCV shell at any given point in time, such as structural loads, seismic loads, hydrodynamic loads, internal pressure loads due to loss of coolant accidents, and reaction loads due to the support of pipes. Consequently, RCCV shells are typically equipped with large size reinforcing steel bars, or rebars, in order to handle the above described loads. When these reinforcing bars encounter a large opening in the RCCV either for a penetration or an access hatch, the reinforcing bars have to be terminated. This results in an interruption of the reinforcing bars, which can affect the transfer of loads and reduce the ability to maintain equilibrium conditions.

As a result, additional reinforcing bars or reinforcing steel frames are often installed around the opening in order to facilitate load transfer. However, this results in congestion problems that complicate the structure and complicate RCCV shell construction. An alternative solution is to locally increase the shell wall thickness around the opening. However increased wall thickness takes up space and sometimes interferes with the arrangement of critical reactor components and structures in adjacent areas. Consequently, it is desirable to provide a load transfer mechanism for reinforcing bars around an opening in an RCCV shell.

BRIEF SUMMARY OF THE INVENTION

In an exemplary embodiment, a reinforced concrete containment vessel (RCCV) for a nuclear reactor in a nuclear power plant includes a cylindrical shell having a side wall with at least one opening therethrough. The RCCV also include a plurality of reinforcing bars, at least one of which is interrupted at the shell wall opening. A reinforcing plate having an opening is located in the shell wall so that the reinforcing plate opening is aligned with the shell wall opening and the interrupted reinforcing bars are connected to the reinforcing plate.

A penetration sleeve is positioned in the reinforcing plate opening. The penetration sleeve has an outer diameter that is smaller than the corresponding reinforcing plate opening, and is secured to the reinforcing plate. Reinforcing bars include vertical reinforcing bars and horizontal hoop reinforcing bars. Reinforcing bar terminators connect the reinforcing bars to the reinforcing plate. The reinforcing bars and the reinforcing plate are fabricated from structural steel.

DETAILED DESCRIPTION OF THE INVENTION

Figure 1:
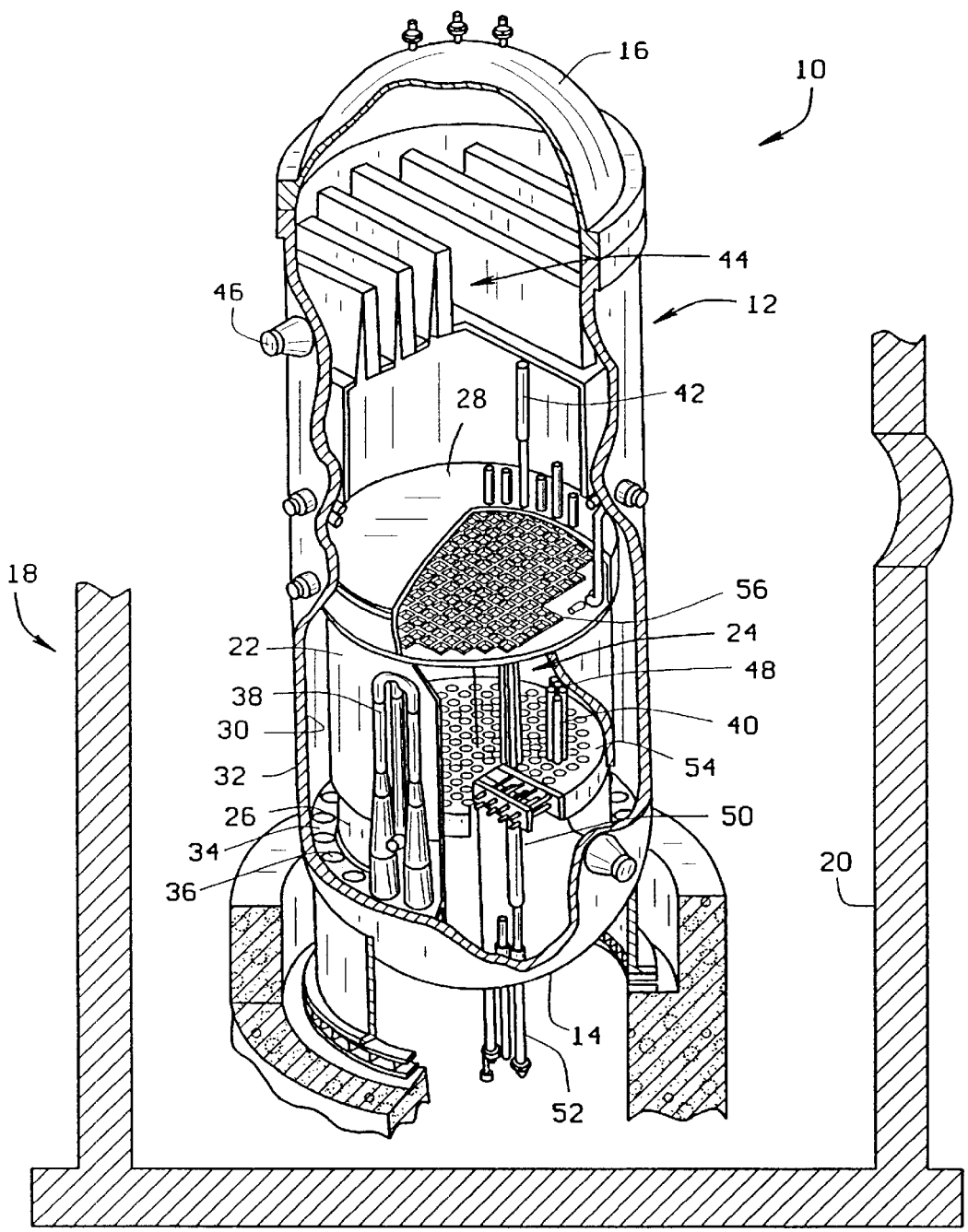
FIG. 1 is a front sectional view, with parts cut away, of a boiling water nuclear reactor pressure vessel enclosed in an RCCV in accordance with an embodiment of the present invention.

FIG. 1 is a front sectional view, with parts cut away, of a boiling water nuclear reactor 10. However, the present invention is equally applicable to other types of nuclear reactors, and the description of reactor 10 is therefore provided for illustrative purposes only rather than by way of limitation. Reactor 10 includes a reactor pressure vessel (RPV) 12 that is generally cylindrical in shape and is closed at one end by a bottom head 14 and at its other end by a removable top head 16. Reactor 10 is located within a reinforced concrete containment vessel (RCCV) 18 that includes a side wall 20. RCCV side wall 20 includes openings (not shown in FIG. 1) located to receive steam lines, feedwater lines, emergency cooling lines, instrumentation and control lines, electrical power lines, equipment hatches, and/or personnel access hatches (not shown).

RPV 12 includes a cylindrically shaped core shroud 22 that surrounds a reactor core 24. Shroud 22 is supported at one end by a shroud support 26 and includes a removable shroud head 28 at the other end. An annulus 30 is formed between shroud 22 and an RPV side wall 32. A pump deck 34, which has a ring shape, extends between shroud support 26 and RPV side wall 32. Pump deck 34 includes a plurality of circular openings 36, with each opening housing a jet pump assembly 38. Jet pump assemblies 38 are circumferentially distributed around core shroud 22.

Heat is generated within core 24, which includes fuel bundles 40 of fissionable material. Water circulated up through core 24 is at least partially converted to steam. Steam separators 42 separates steam from water, which is recirculated. Residual water is removed from the steam by steam dryers 44. The steam exits RPV 10 through a steam outlet 46 near vessel top head 16.

The amount of heat generated in core 24 is regulated by inserting and withdrawing control rods 48 of neutron absorbing material. To the extent that control rods 48 are inserted into fuel bundles 40, they absorb neutrons that would otherwise be available to promote the chain reaction which generates heat in core 24. Control rod guide tubes 50 maintain the vertical motion of control rods 48 during insertion and withdrawal. Control rod drives 52 effect the insertion and withdrawal of control rods 48. Control rod drives 52 extend through bottom head 14.

Fuel bundles 40 are aligned by a core plate 54 located at the base of core 24. A top guide 56 aligns fuel bundles 40 as they are lowered into core 24. Core plate 54 and top guide 56 are supported by core shroud 22.

Figure 2:
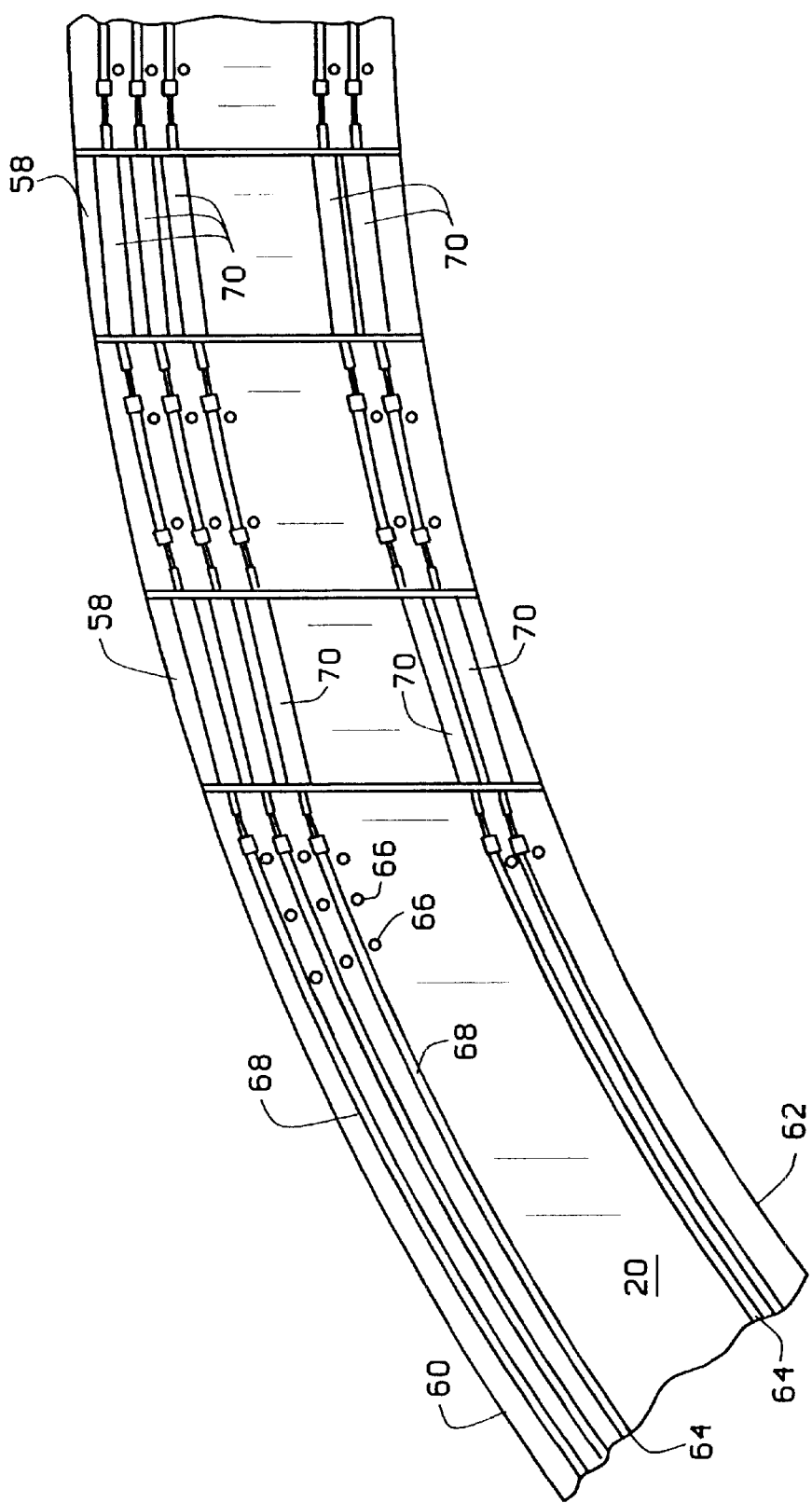
FIG. 2 is a top sectional view of a segment of the RCCV cylindrical shell shown FIG. 1 including multiple reinforcing plates.

FIG. 2 is a top sectional view of RCCV side wall 20 having openings 58 that extend from an outer surface 60 to an inner surface 62 of wall 20. Openings 58 are located to receive steam lines, feedwater lines, emergency cooling lines, instrumentation and control lines, electrical power lines, equipment hatches, and/or personnel access hatches (not shown). Terminated at side wall openings 58 are reinforcing bars 64. Reinforcing bars 64 include vertical reinforcing bars 66 and horizontal hoop reinforcing bars 68. Reinforcing bars 66 are connected to reinforcing plates 70. Reinforcing bars 66 and reinforcing plates 70 can be fabricated from any suitable material, for example, structural steel.

Figure 3:
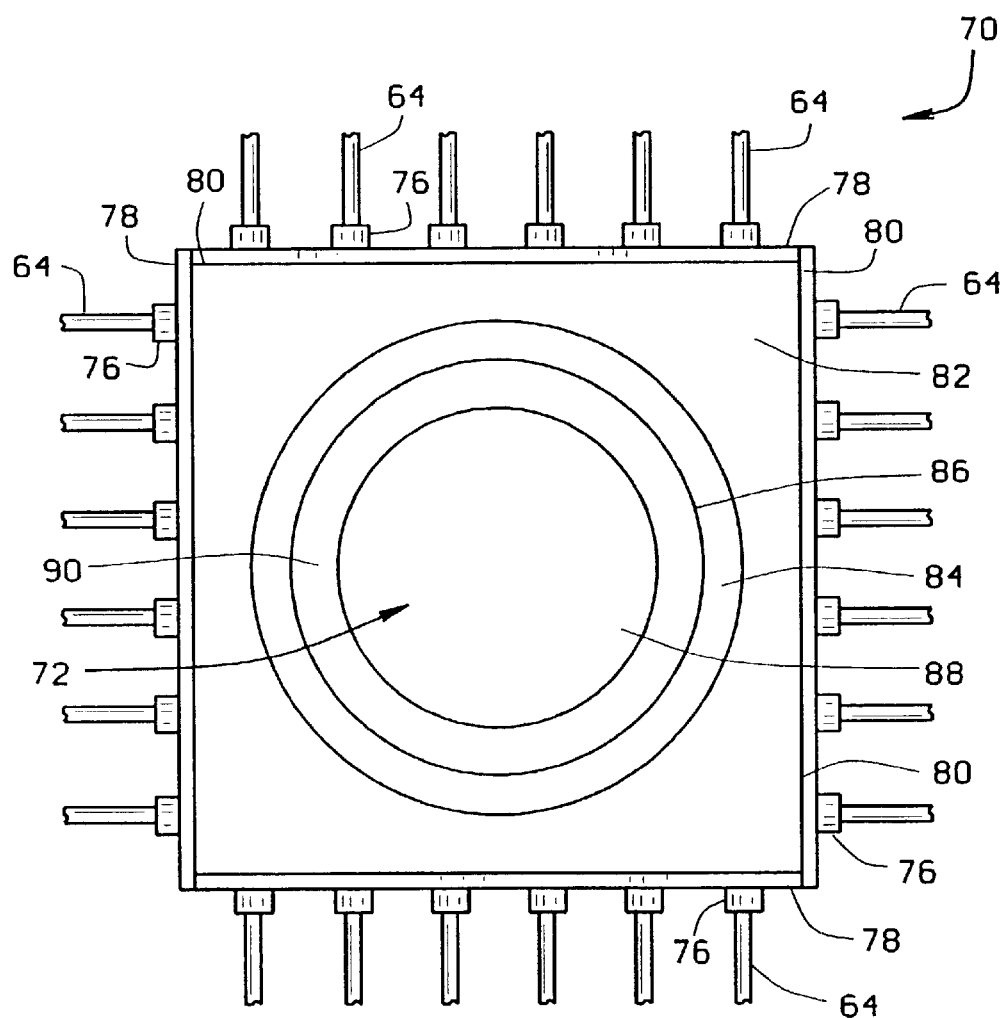
FIG. 3 is a front view of a reinforcing plate shown in FIG. 2.

FIG. 3 is a front view of reinforcing plate 70. Reinforcing plate 70 has a substantially square shape and includes an opening 72 that is substantially aligned with a side wall opening 58 (shown in FIG. 2). Reinforcing plate opening 72 is substantially circular. In alternate embodiments, reinforcing plate 70 and/or opening 72 can have different shapes such as a polygonal shape or an elliptical shape.

A plurality of layers of reinforcing bars 64 connect to reinforcing plate 70 with reinforcing bar terminators 76. Reinforcing plate 70 includes an outer flange 78 at a peripheral edge 80 that surrounds a reinforcing plate intermediate portion 82. Reinforcing bar terminators are attached to outer flange 78. A reinforcing plate inner flange 84 is adjacent reinforcing plate opening 72 and is sized to receive a penetration sleeve 86 that is secured to reinforcing plate inner flange 84. Penetration sleeve 86 includes a bore 88 to accommodate steam lines, feedwater lines, instrumentation and control lines, or electrical power lines (not shown). In one embodiment, outer flange 78 has a thickness greater than a thickness of inner flange 84 which has a thickness greater than a thickness of intermediate portion 82. In an another embodiment, reinforcing plate opening 72 includes a diameter larger than an outer diameter of a corresponding penetration sleeve 86. In other words, reinforcing plate opening 72 has a diameter larger than an inner diameter of penetration sleeve 86 plus twice the thickness of a penetration sleeve wall 90.

Reinforcing plate 70 is installed into RCCV shell side wall 20 (shown in FIG. 1) by positioning reinforcing plate 70 in side wall 20 at a location corresponding opening 58. Vertical and horizontal hoop reinforcing bars 66 and 68 are coupled to reinforcing bar terminators 76 which are attached to reinforcing plate 70. A penetration sleeve 86 is positioned in reinforcing plate opening 72 and secured to reinforcing plate inner flange 84, for example, by welding. Concrete is subsequently used to form RCCV shell side wall 20.

Figure 4:
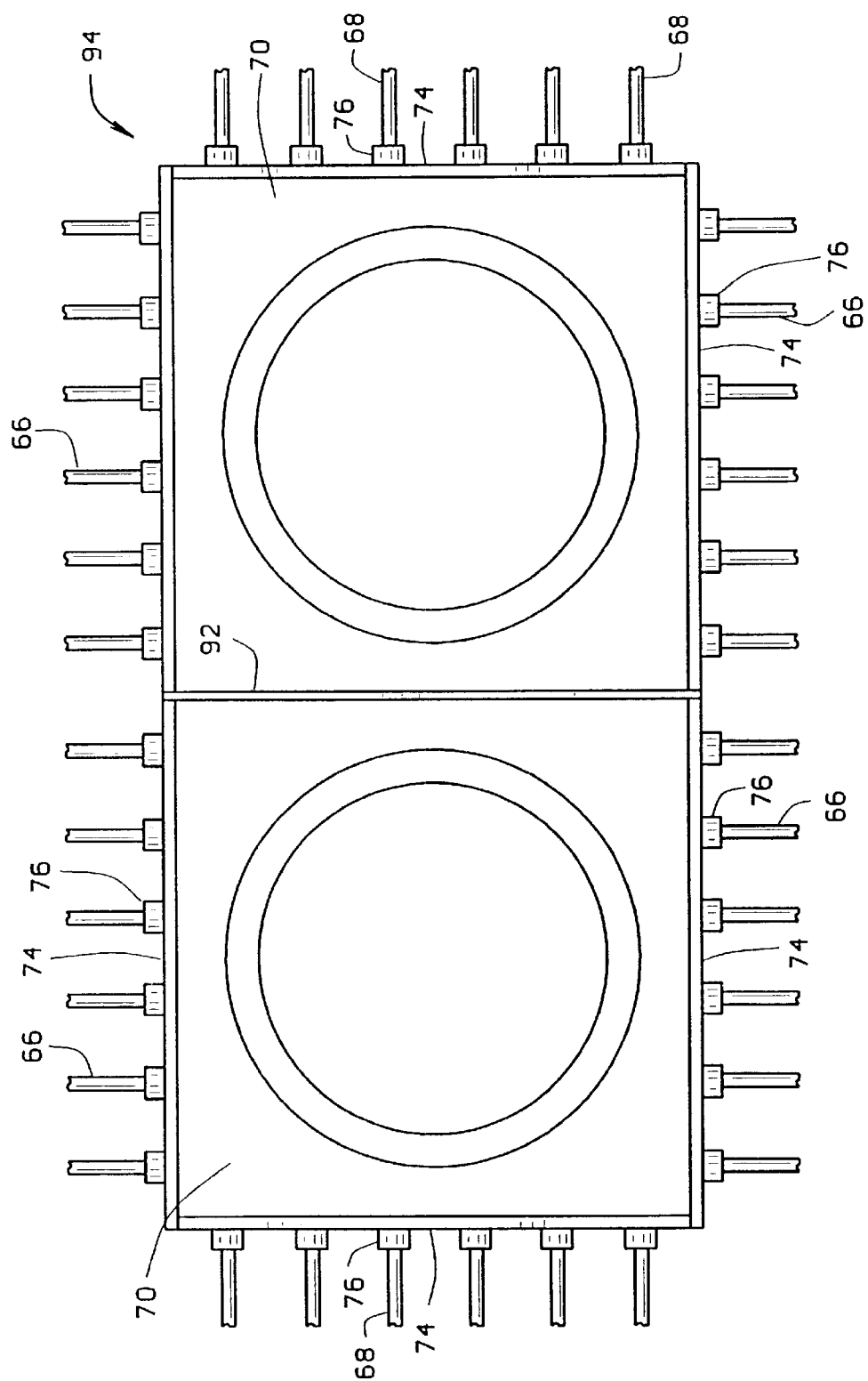
FIG. 4 is a front view of two reinforcing plates welded together in accordance with another embodiment of the present invention.

FIG. 4 is a front view of two reinforcing plates 70 connected together at an outer edge contact region 92 to form a double reinforcing plate 94. Reinforcing plates 70 are welded together at contact region 92, and reinforcing plates 70 do not include a flange 74 at contact region 92. In this embodiment, RCCV shell side wall 20 has two adjacent openings (not shown) located to accommodate two penetrations (not shown). Vertical reinforcing bars 66 and horizontal hoop reinforcing bars 68 are terminated around the respective openings. Accordingly, vertical reinforcing bars 66 and horizontal hoop reinforcing bars 68 are attached to outer flanges 74 of reinforcing plates 70 with reinforcing bar terminators 76. This particular configuration is provided in order to illustrate the combination of reinforcing plates in order to accommodate a plurality of adjacent RCCV shell side wall openings. The present invention may be practiced with a variety of configurations of adjacent side wall openings, with regard to number and relative location, similar or dissimilar to the particular configuration presented in FIG. 4. Therefore, the configuration of reinforcing plates 70 in FIG. 4 is provided for illustrative purposes only and is not intended to limit the invention to any particular configuration. In addition, multiple reinforcing plates may be positioned adjacent one another, in order to accommodate situations wherein one side wall opening is configured to include a plurality of penetration sleeves 86.

Figure 5:
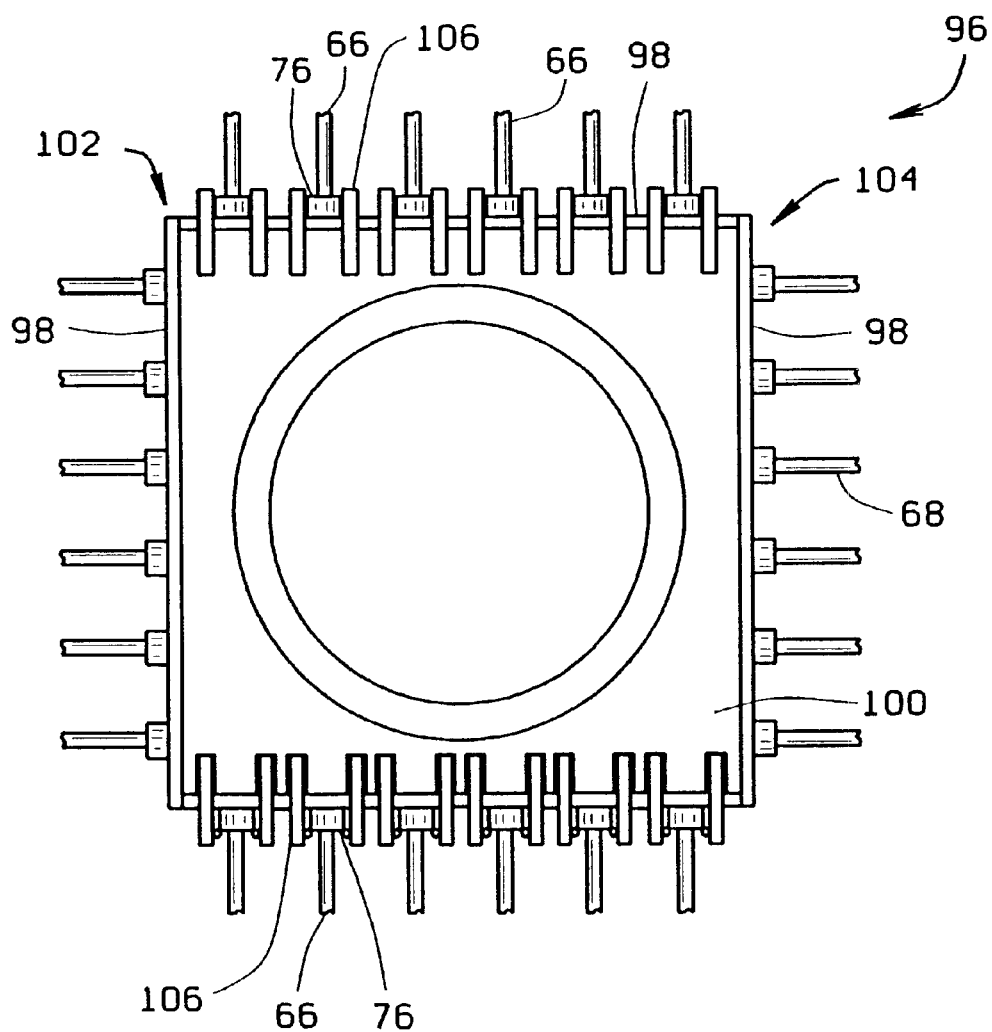
FIG. 5 is a front view of a reinforcing plate having reinforcing bar extensions in accordance with another embodiment of the present invention.

FIG. 5 is a front view of a reinforcing plate 96 that includes a discontinuous reinforcing plate outer flange 98 in accordance with another embodiment of the present invention. Flange 98 partially surrounds a reinforcing plate intermediate portion 100. Particularly, outer flange 98 surrounds reinforcing plate 96 along a first side 102 and an opposing second side 104. Reinforcing plate 96 includes reinforcing bar extensions 106. Vertical reinforcing bars 66 are connected to reinforcing bar terminators 76 which are attached to extensions 106. Extensions 106 are welded to reinforcing plate intermediate portion 100.

Figure 6:
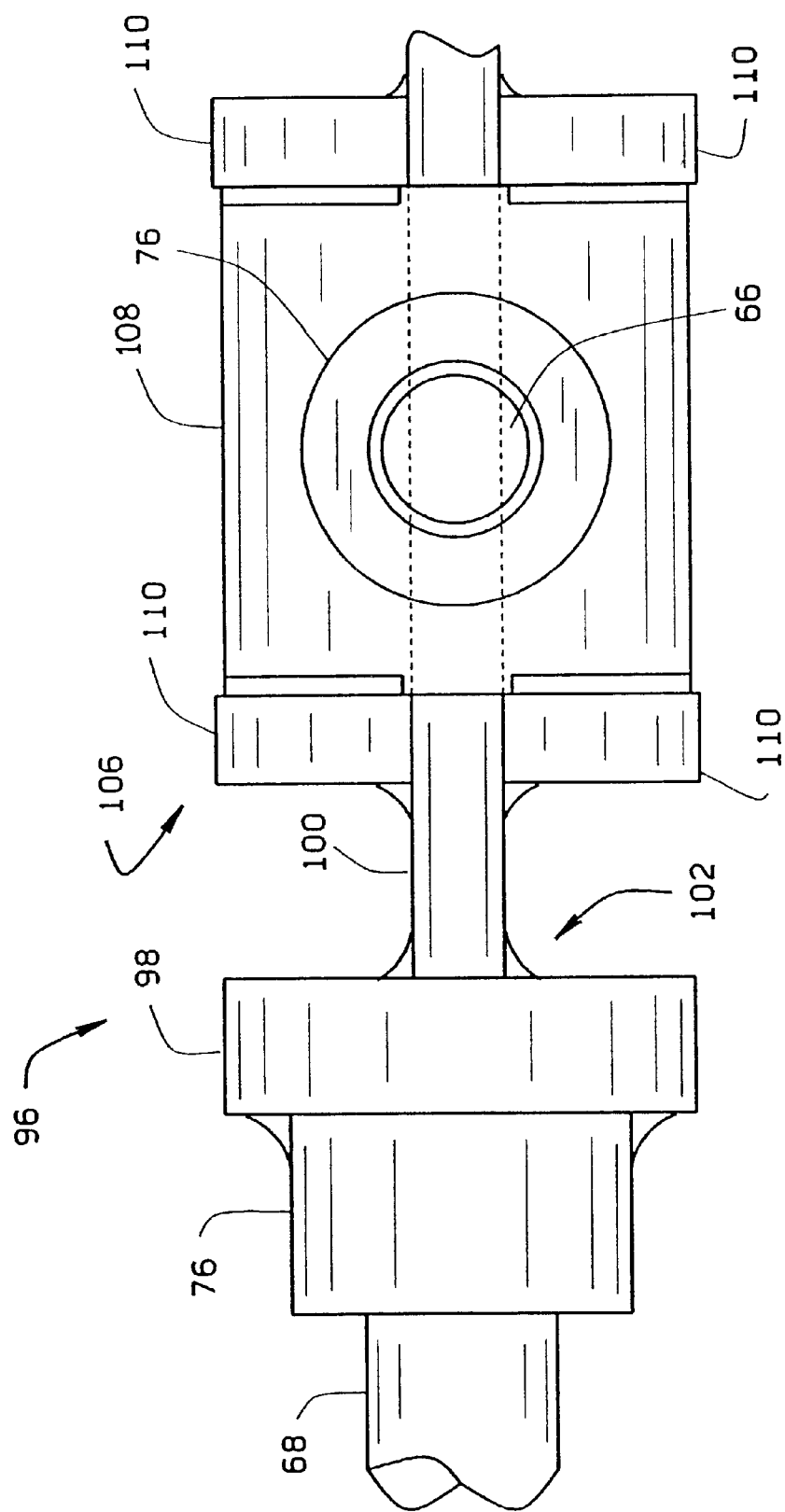
FIG. 6 is a top view of a portion of the reinforcing plate and reinforcing bar extensions shown in FIG. 5.

FIG. 6 is a top view of reinforcing plate 96, at first side 102. Reinforcing bar extensions 106 are attached to reinforcing plate intermediate portion 100. Specifically, vertical reinforcing bar 66 is connected to terminator 76 which is attached to an extension plate 108. Extension plate 108 is connected to extension flanges 110 which are attached to plate intermediate portion 100. Extensions 106 minimize eccentricity in the connections between horizontal hoop reinforcing bars 68, vertical reinforcing bars 66, and reinforcing plate 96.

Figure 7:
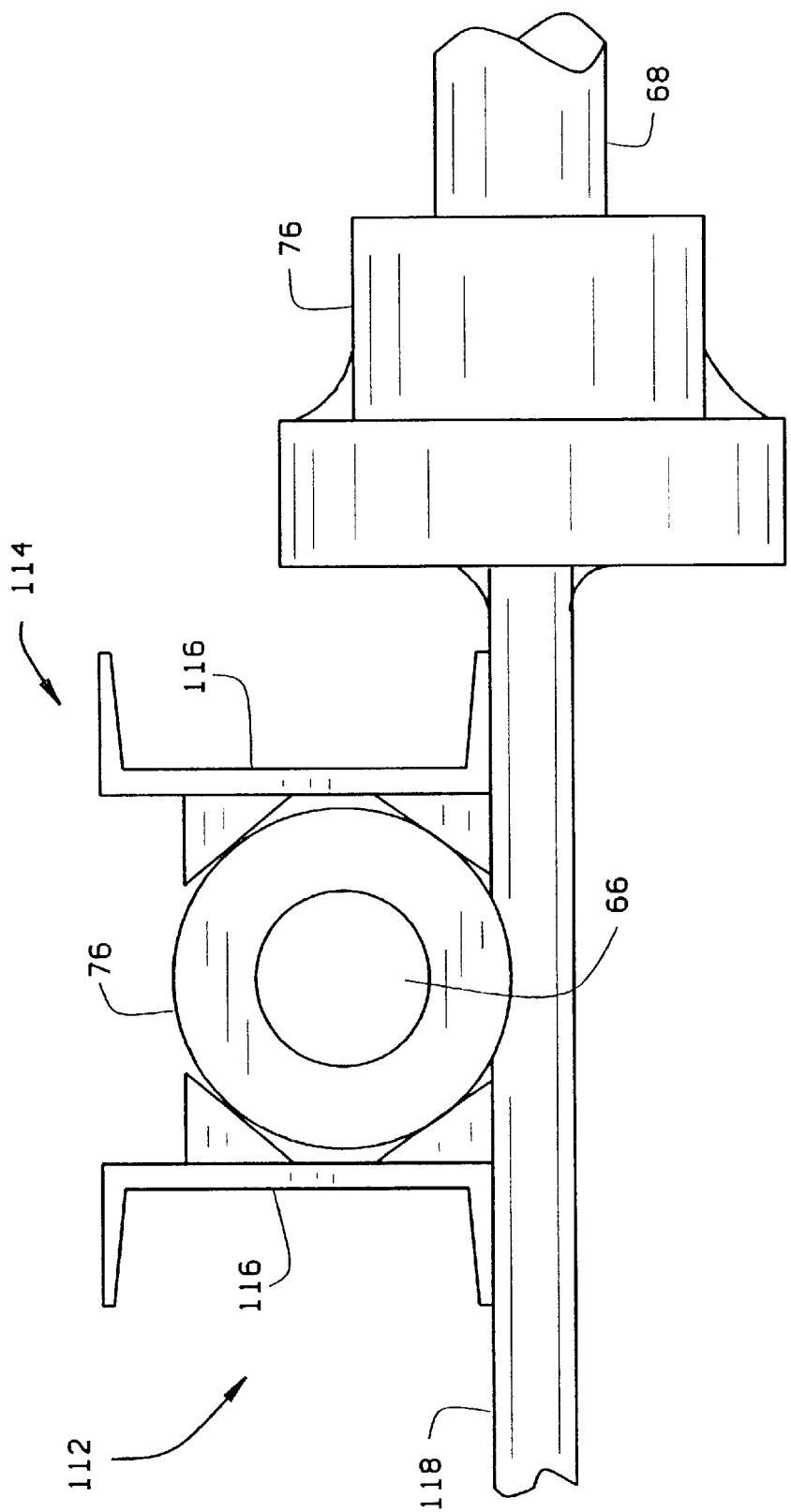
FIG. 7 is a top view of a portion of a reinforcing plate with reinforcing bar extensions in accordance with still another embodiment of the present invention.

FIG. 7 is a top view of reinforcing plate 112 in accordance with another embodiment of the present invention. A plurality of reinforcing bar extensions 114 (one shown) are coupled to reinforcing plate 112. Reinforcing bar extensions 114 include brackets 116 which receive terminators 76. Brackets 116 are connected to an reinforcing plate intermediate portion 118. Reinforcing bar extensions 114 are provided to accommodate a reinforcing plate 112 that does not align with vertical reinforcing bars 66 while aligning with horizontal reinforcing bars 68.

Reinforcing plates 96 and 112 can include a variety of reinforcing bar extensions similar or dissimilar to reinforcing bar extensions 106 and 114. Therefore, while specific configurations of reinforcing bar extensions have been discussed, reinforcing bar extensions 106 and 114 are provided for illustrative purposes only and are not intended to limit the invention to any particular type of reinforcing bar extension. In addition, a variety of reinforcing bar extension configurations may be used in combination with a variety of reinforcing bar terminator configurations within the scope of the present invention.

Figure 8:
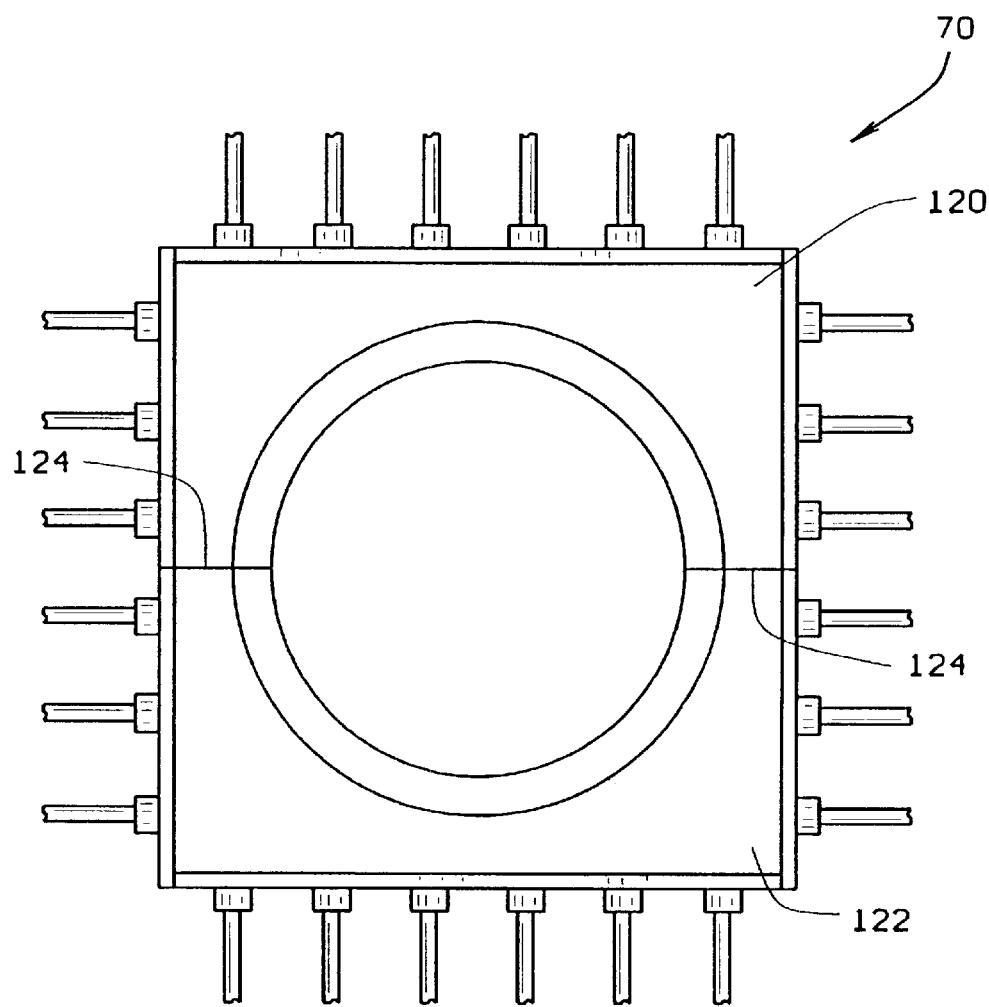
FIG. 8 is a side view of the reinforcing plate shown in FIG. 2 that is formed from two plate sections.

FIG. 8 shows a front view of reinforcing plate 70 formed from several reinforcing plate sections 120 and 122. The reinforcing plate sections 120 and 122 are welded together on site to facilitate a timely installation. Particularly, reinforcing plate 70 is formed from two half-plate sections 120 and 122 with seams 124 located along a horizontal centerline.

Reinforcing plates 70, 96, and 112 described above provide a positive means for load transfer across an opening 58 in an RCCV side wall 20 where reinforcing bars 64 are terminated. Reinforcing plates 70, 96, and 112 eliminate congestion problems due to excessive usage of reinforcing bars 64 adjacent to an opening 58, as well as the need to locally increase the thickness of RCCV side wall 20 adjacent to opening 58. Additionally, fabricating RCCV 18 using reinforcing plates 70, 96, and 112 shortens and improves construction schedules. Further, reinforcing plates 70, 96, and 112 are particularly useful when the diameter of an opening 58 is larger than the thickness of RCCV side wall 20.

While the invention has been described in terms of various specific embodiments, those skilled in the art will recognize that the invention can be practiced with modification within the spirit and scope of the claims.

What is claimed is:

1. A reinforced concrete containment vessel comprising:
    a side wall having at least one opening extending therethrough;
    a plurality of reinforcing bars, at least one of said reinforcing bars being interrupted at said at least one opening; and
    at least one reinforcing plate positioned in said side wall, each said reinforcing plate comprising a flange extending at least partially around, and directly connected to a periphery of said reinforcing plate, and an opening substantially aligned with a corresponding side wall opening, each said reinforcing plate connected to at least one interrupted reinforcing bar.

2. A reinforced concrete containment vessel in accordance with claim 1 further comprising at least one penetration sleeve, each said penetration sleeve extending through a corresponding reinforcing plate opening and through a corresponding side wall opening, each said penetration sleeve having an outer diameter smaller than said corresponding reinforcing plate opening.

3. A reinforced concrete containment vessel in accordance with claim 2 wherein each said penetration sleeve is secured to a corresponding reinforcing plate.

4. A reinforced concrete containment vessel in accordance with claim 1 wherein said plurality of reinforcing bars comprises a plurality of vertical reinforcing bars and a plurality of horizontal hoop reinforcing bars.

5. A reinforced concrete containment vessel in accordance with claim 1 wherein said at least one reinforcing plate comprises at least one reinforcing bar terminator coupled to said at least one interrupted reinforcing bar and attached to an edge of said reinforcing plate.

6. A reinforced concrete containment vessel in accordance with claim 5 wherein said reinforcing bar terminator is coupled to said at least one interrupted reinforcing bar and attached to said peripheral flange of said reinforcing plate.

7. A reinforced concrete containment vessel in accordance with claim 1 wherein each said reinforcing plate comprises a substantially polygonal shape or a substantially circular shape.

8. A reinforced concrete containment vessel in accordance with claim 1 wherein said at least one reinforcing plate comprises two reinforcing plates, said reinforcing plates welded together along corresponding edges.

9. A reinforced concrete containment vessel in accordance with claim 1 wherein at least one said reinforcing plate comprises a plurality of reinforcing plate sections, said reinforcing plate sections welded together to form a reinforcing plate.

10. A reinforced concrete containment vessel in accordance with claim 1 wherein each said reinforcing plate comprises a plurality of extensions, said reinforcing plate extensions connecting said reinforcing plate with said at least one interrupted reinforcing bar.

11. A reinforced concrete containment vessel in accordance with claim 1 wherein each said reinforcing plate comprises steel.

12. A nuclear reactor comprising a reactor pressure vessel enclosed in a reinforced concrete containment vessel, said reinforced concrete containment vessel comprising:
    a side wall having at least one opening extending therethrough;
    a plurality of reinforcing bars, at least one of said reinforcing bars being interrupted at said at least one opening; and
    at least one reinforcing plate positioned in said side wall, each said reinforcing plate comprising a flange extending at least partially around, and directly connected to a periphery of said reinforcing plate, and an opening substantially aligned with a corresponding said side wall opening, each said reinforcing plate connected to said at least one interrupted reinforcing bar.

13. A nuclear reactor in accordance with claim 12 further comprising at least one penetration sleeve, each said penetration sleeve extending through a corresponding reinforcing plate opening and through a corresponding side wall opening, each said penetration sleeve having an outer diameter smaller than said corresponding reinforcing plate opening.

14. A nuclear reactor in accordance with claim 13 wherein each said penetration sleeve is secured to a corresponding reinforcing plate.

15. A nuclear reactor in accordance with claim 12 wherein said plurality of reinforcing bars comprises a plurality of vertical reinforcing bars and a plurality of horizontal hoop reinforcing bars.

16. A nuclear reactor in accordance with claim 12 wherein said at least one reinforcing plate comprises at least one reinforcing bar terminator coupled to said at least one interrupted reinforcing bar and attached to an edge of said reinforcing plate.

17. A nuclear reactor in accordance with claim 16 wherein said reinforcing bar terminator is coupled to said at least one interrupted reinforcing bar and attached to said peripheral flange of said reinforcing plate.

18. A nuclear reactor in accordance with claim 12 wherein each said reinforcing plate comprises a substantially polygonal shape or a substantially circular shape.

19. A nuclear reactor in accordance with claim 12 wherein said at least one reinforcing plate comprises two reinforcing plates, said reinforcing plates welded together along corresponding edges.

20. A nuclear reactor in accordance with claim 12 wherein at least one said reinforcing plate comprises a plurality of reinforcing plate sections, said reinforcing plate sections welded together to form a reinforcing plate.

21. A nuclear reactor in accordance with claim 12 wherein each said reinforcing plate comprises a plurality of extensions, said reinforcing plate extensions connecting said reinforcing plate with said at least one interrupted reinforcing bar.

\* \* \* \* \*